United States Patent Office 3,247,189
Patented Apr. 19, 1966

3,247,189
3,19 AND 20 OXYGENATED-Δ⁵-PREGNENES
Albert Wettstein, Riehen, and Georg Anner, Karl Heusler, and Jaroslav Kalvoda, Basel, and Hellmut Ueberwasser, Riehen, Switzerland, assignors to Ciba Corporation, New York, N.Y., a corporation of Delaware
No Drawing. Filed Sept. 7, 1962, Ser. No. 222,205
Claims priority, application Switzerland, July 15, 1960, 8,133/60; Oct. 28, 1960, 12,107/60; Dec. 23, 1960, 14,393/60; Apr. 5, 1961, 3,990/61, 3,991/61; June 2, 1961, 6,481/61, 6,482/61; Sept. 18, 1961, 10,803/61; Sept. 22, 1961, 11,071/61
12 Claims. (Cl. 260—239.55)

This application is a continuation-in-part of our copending applications Ser. No. 122,655, filed July 10, 1961, now U.S. Patent No. 3,067,198 and Ser. No. 122,656, filed July 10, 1961, now U.S. Patent No. 3,079,482 by Albert Wettstein et al.

The present invention relates to 19-oxygenated Δ⁵-pregnenes of the Formula I

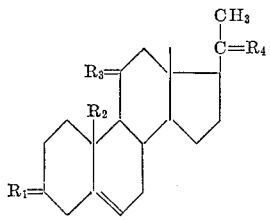

(I)

wherein
$R_1$ stands for oxo or hydrogen together with hydroxy or acyloxy,
$R_2$ stands for a free or acetalized oxo-group or a free or esterified carboxyl group,
$R_3$ stands for hydrogen, oxo or hydrogen together with a free or esterified hydroxyl group,
$R_4$ stands for oxo or hydrogen together with hydroxy or acyloxy and to 19-oxygenated Δ⁵-pregnenes of the Formula II

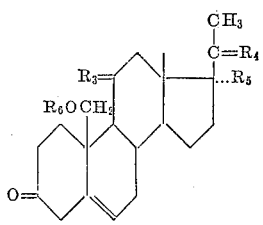

wherein $R_3$ and $R_4$ have the meanings given above $R_5$ stands for hydrogen, hydroxy or acyloxy and $R_6$ stands for hydrogen or acyl.

The acyloxy radicals mentioned above, representing esterified hydroxyl groups, are more especially those of aliphatic, cycloaliphatic, cycloaliphatic-aliphatic, araliphatic, aromatic or heterocyclic carboxylic acids containing at most 15 carbon atoms, such as for example formic, acetic, propionic, butyric, valeric, trimethylacetic, caproic, oenanthic, decanoic, trifluoracetic, carbonic-monomethyl- or ethylester, hexahydrobenzoic, cyclopentyl-propionic, phenyl-propionic, benzoic or furoic acid. The halogen atoms mentioned are fluorine, chlorine or bromine, in the 5α-position especially chlorine or bromine, and the lower alkyl, alkenyl or alkinyl radicals are such as contain at most 7 carbon atoms, for example methyl, ethyl, n- or i-propyl, -butyl, -pentyl, -hexyl or -heptyl, vinyl, allyl, methallyl, ethinyl, 2-methyl-ethinyl, 2-chloro-ethinyl and 2-trifluoromethyl-ethinyl.

Ketalized oxo groups for example lower alkylene-dioxy groups, such as ethylenedioxy or propylenedioxy groups and etherified hydroxy groups are for example lower alkoxy groups, such as methoxy, ethoxy or propoxy groups or the tetrahydro-pyranyloxy group.

The compounds of the present invention are important intermediates in a new and simple process for the conversion of normal steroids into 19-nor-steroids. A number of 19-nor-steroids, more especially of 19-nor-progesterone and its derivatives (namely 17α-acetoxy-19-nor-progesterone, 17α - capronyloxy - 19 - nor - progesterone, 11-oxo-19-nor-progesterone) are important as progestational agents, e.g. for the treatment of menstrual disorders. A new process for the production of these compounds and the new intermediates obtained thereby are therefore of significant technical importance.

So far 19-nor-steroids were available only by a complicated sequence of reactions which involved pyrolytic aromatization of the ring A and subsequent reduction with an alkali metal and ammonia. An alternative synthesis uses a microbiological hydroxylation of the 19-carbon atom followed by elimination of the oxygenated angular substituent. The 19-oxygenated Δ⁵-pregnenes of the present invention however can not be prepared by any of the known processes.

The new process in which the claimed compounds are produced is as follows:

(a) A 5α-halogen-6β-hydroxy-pregnane is treated with lead tetraacetate in boiling benzene or cyclohexane or with lead tetraacetate and iodine in boiling cyclohexane under irradiation with visible light to form a 5α-halogen-6β:19-oxido-pregnane. In the case of 5α-halogen-6β-hydroxy-pregnanes with a 11α-acetoxy or 11-keto-substituent 5α-halogen-6β:19-oxido-19 - hydroxy - pregnanes are formed as by products. These can be oxidized with chromium trioxide to 19:6β-lactones of 5α-halogen-6β-hydroxy-pregnane-19-oic acids which can also be prepared by oxidation of the 19-unsubstituted 5α-halogen-6β:19-oxides with chromium trioxide in acetic acid at 70–90°. These steps of the process are described in detail in our copending application Ser. No. 222,168, filed September 7, 1962.

(b) The 5α-halogen-6β:19 - oxido - pregnenes (which may be substituted in 19-position by a hydroxy or oxo group) obtained according to step (a) are treated with a metallic reducing agent for example with sodium and liquid ammonia or preferably with zinc and acetic acid whereby Δ⁵-19-hydroxy-pregnenes (from 19-unsubstituted 5α-halogen-6β:19-oxido-pregnanes), Δ⁵-19-oxo-pregnenes (from 5α-halogen-6β:19-oxido-19-hydroxy-pregnenes) or Δ⁵-pregnene-19-oic acids (from the above 19:6β-lactones) are formed. Alternatively the 5α-halogen-6β:19-oxido-pregnenes formed in step a) are first transformed into Δ⁴-3-oxo-6β:19-oxido-pregnenes and these are reduced with zinc and acetic acid or aqueous alcohol to give Δ⁵-3-oxo-19-hydroxy-pregnenes.

(c) The 19-oxygenated Δ⁵-pregnenes formed in step (b) are then converted into Δ⁴-3:19-dioxo-pregnenes or Δ⁴-3-oxo-pregnene-19-oic acids by oxidation and rearrangement of the 5:6-double bond.

(d) Finally the angular substituent in the pregnenes formed in step (c) is eliminated in known manner by acid or base treatment.

The compounds of the invention are mainly those produced in step (b) of the above process. They are prepared for example by reducing 5α-halogen-6β:19-oxido-pregnanes with lithium and ammonia to give Δ⁵-19-hydroxy-pregnenes. During this reaction acyloxy group e.g. in 3- and 20-positions are converted into hydroxy groups. 5α-halogen-6β:19-oxido-19-hydroxy-pregnanes and 19:6β-lactones of 5α - halogen - 6β - hydroxy-pregnane-19-oic acids are smoothly reduced with zinc and acetic acid at a temperature of 40–70° to give Δ⁵-19-oxopregnenes and Δ⁵-pregnenes-19-oic acids. Δ⁵-19-hydroxy-pregnenes can be oxidized to Δ⁵-19-oxo-androstanes with chromium trioxide in pyridine or in acetone with sulfuric acid added at 0° C. At higher temperatures Δ⁵-pregnene-19-oic acids are formed from Δ⁵-19-hydroxy- or -19-oxo-pregnenes. The acids can be esterified with diazomethane or diazoethane to give the methyl and ethyl esters respectively.

The Δ⁵-3-oxo-19-hydroxy-pregnenes are advantageously prepared by reducing a Δ⁴-3-oxo-6β:19-oxido-pregnene with zinc and slightly aqueous or anhydrous acetic acid at a temperature below 50° C. (At higher temperatures Δ⁵-3-oxo-19-hydroxy-pregnenes are rearranged to Δ⁴-3-oxo-19-hydroxy-pregnenes.) Δ⁵-3-oxo-19-hydroxy-pregnenes can be oxidized to Δ⁵-3:19-dioxo-pregnenes or Δ⁵-3-oxo-pregnene-19-acids are described above.

For the conversion into 19-nor-pregnenes 19-oxygenated Δ⁵-3-hydroxy-pregnenes are oxidized to Δ⁴-3-oxo-pregnenes by means of aluminum tertiary butoxide and cyclohexanone in boiling toluene or by means of chromium trioxide in acetone-sulfuric acid and rearrangement of the Δ⁵-3-oxo-pregnene obtained to Δ⁴-3-oxo-pregnene by means of hydrochloric acid in chloroform or by heating with glacial acetic acid.

In the 19-oxygenated Δ⁴-3-oxo-pregnene the angular substituent is eliminated in known manner. 19-hydroxy-Δ⁴-3-oxo-pregnenes can be treated with strong base such as sodium hydroxide to yield Δ⁴-3-oxo-19-nor-pregnenes. It is however of advantage to use the Δ⁴-3:19-dioxo-pregnenes or Δ⁴-3-oxo-pregnene-19-oic acids as intermediate for the production of 19-nor-pregnenes. The former lose the aldehyde group under the influence of base such as potassium hydroxide or potassium methoxide, the latter are decarboxylated by heating in pyridine or acetic acid or by treatment with concentrated hydrochloric acid in an alcohol such as methanol or tertiary butanol.

The following examples illustrate the invention. The temperatures are given in degrees centigrade.

*Example 1*

200 cc. of ammonia are condensed in a stirring flask of 500 cc. capacity, and 1.5 grams of lithium metal are then added in small portions. The resulting blue solution is treated dropwise within 15 minutes with 1.95 grams of 3β:20β-diacetoxy-5α-chloro-6β:19-oxido-pregnane in 20 cc. of tetrahydrofuran and the whole is stirred for 1.5 hours longer. A mixture of 20 cc. of methanol and 100 cc. of ether is then slowly added, and the ammonia is allowed to evaporate. Finally, another 100 cc. of tetrahydrofuran are added, for 1 hour nitrogen is passed through the suspension which is then diluted with 200 cc. of water and repeatedly extracted with methylene chloride. The extracts are washed with dilute sulfuric acid and with water, dried and evaporated, to yield 1.82 grams of crude Δ⁵-3β:19:20β-trihydroxy-pregnene which is dissolved in 200 cc. of acetone and stirred for 35 minutes at 0° C. with 5.0 cc. of a solution, diluted with water to 50.0 cc. of 13.3 grams of chromium trioxide in 11.5 cc. of concentrated sulfuric acid. A solution of 50 grams of crystalline sodium acetate in 80 cc. of water is then added, the whole is diluted with 500 cc. of benzene, the solution is repeatedly washed with water, and the aqueous solution is repeatedly extracted with benzene. The solution is dried and evaporated in water-jet vacuum, and the residue contains the Δ⁵-3:19:20-trioxo-pregnene and is taken up in 100 cc. of chloroform and saturated at +10° C. with hydrogen chloride gas. The mixture is left to itself for 16 hours at 25° C. and then evaporated in a water-jet vacuum. Chromatography of the residue on 30 grams of alumina yields 810 mg. of 19-nor-progesterone melting at 141–144° C.

*Example 2*

100 mg. of 3β:11α:20β-triacetoxy-5α-chloro-6β:19-oxido-19-hydroxypregnane are dissolved in 5 cc. of glacial acetic acid and stirred for one hour at 100° C. after adding 1.0 gram of zinc dust. The unused zinc is then filtered off, washing is carried out with glacial acetic acid and the filtrate is evaporated in a water-jet vacuum. The residue is taken up in methylene chloride and the solution is washed with sodium bicarbonate solution and with water, dried and evaporated. 86 mg. of pure crystalline Δ⁵-3β:11α:20β-triacetoxy-19-oxopregnene melting at 176–178° C. (with decomposition) are obtained; $[\alpha]_D^{25} = -185°$ (in chloroform); IR-bands inter alia at 5.77μ (aldehyde+acetates); 8.10, 9.24, 9.36, 9.75, 10.45, 10.83 and 12.56μ.

56 mg. of Δ⁵-3β:11α:20β-triacetoxy-19-oxopregnene are dissolved in 5 cc. of acetone. To the solution, which has been cooled to 0° C., there is added 0.3 cc. of a 26.6% solution of chromium trioxide in sulfuric acid of 42% strength and the mixture is stirred for 45 minutes at 0° C. 1.0 cc. of isopropanol is then added and the mixture is diluted with benzene after 10 minutes and washed several times with water. The dried benzene solution is evaporated to dryness. 58 mg. of Δ⁵-3β:11α:20β-triacetoxypregnene-19-acid, which melts at 154–158° C. after crystallization from ether, are obtained. IR-bands inter alia at 2.95, 5.78, 5.80, 8.17, 9.29, 9.41, 9.77, 10.50, 10.88 and 11.77μ.

*Example 3*

A solution of 1.015 grams of Δ⁵-3β:11α:20β-triacetoxy-19-oxopregnene in 100 cc. of benzene is mixed with 16 cc. of ethylene glycol and 80 mg. of para-toluenesulfonic acid, and the mixture is boiled for 8 hours with vigorous stirring and with the use of a water separator, then allowed to cool, poured into 100 cc. of dilute sodium bicarbonate solution, diluted with another 50 cc. of benzene and agitated. The benzene solution is washed with water, dried and evaporated in a water-jet vacuum, to yield 1.10 grams of amorphous Δ⁵-3β:11α:20β-triacetoxy-19-ethylenedioxypregnene which contains in the infra-red spectrum bands inter alia at 5.78, 7.30, 8.11, 9.05, 9.24, 9.36 and 9.73μ.

A solution of 375 mg. of the above compound in 40 cc. of methanol is mixed with a solution of 770 mg. of potassium carbonate in 12 cc. of water and then refluxed for 14 hours, concentrated in a water-jet vacuum to about 15 cc., diluted with 25 cc. of saturated sodium chloride solution and repeatedly extracted with a 4:1-mixture of methylene chloride and methanol. The extracts yield 35 mg. of crude Δ⁵-3β:11α:20β-trihydroxy-19-ethylenedioxypregnene which after crystallization from acetone+ether, melts at 145–148° C. Optical rotation $[\alpha]_D = -80°$ (in chloroform).

A solution of 150 mg. of Δ⁵-3β:11α:20β-trihydroxy-19-ethylenedioxypregnene in 50 cc. of acetone is mixed at 0° C. with 0.5 cc. of a 24.6% solution of chromium trioxide in sulfuric acid of 42% strength and the whole is stirred for 15 minutes at 0° C., then mixed with 1.5 cc. of isopropanol and stirred for another 5 minutes. The batch is then diluted with a solution of 1.0 gram of crystalline sodium acetate in 5 cc. of water, diluted with 150 cc. of benzene, filtered and washed twice with water. The benzene solution is dried and evaporated, to yield 140 mg. of Δ⁵-3:11:20-trioxo-19-ethylene-dioxypregnene as a pale yellowish residue which is dissolved in 20 cc. of glacial acetic acid, mixed with 500 mg. of anhydrous potassium acetate, and the solution is heated for 30 minutes at 100° C., then cooled, poured into 100 cc. of water and extracted with methylene chloride. The extracts are successively washed with water, dilute sodium bicarbonate solution and with water and yield on evaporation 125 mg. of crude Δ⁴-3:11:19:20-tetraoxopregnene which, after recrystallization from methylene chloride+ether, crystallizes in small scales which above about 170° C. turn into needles and melt at 205–207° C. Optical rotation $[\alpha]_D = +527°$ (in chloroform). Ultra-violet maximum at 247 mμ

($\epsilon=11,150$). Infra-red bands inter alia at 5.83, 5.95, 6.15, 7.19, 7.37, 8.16, 8.24, 8.65 and 11.60$\mu$.

Example 4

500 mg. of $\Delta^4$-3:20-dioxo-6$\beta$:19-oxido-pregnene (6$\beta$: 19-oxido-progesterone) in 20 ml. of glacial acetic acid are stirred for 20 minutes at 20–25° C. after the addition of 15 grams of zinc dust. The mixture is then filtered, the filter residue washed with benzene and the filtrate concentrated at 25 to 30° C. under reduced pressure to a volume of about 10 ml. It is then diluted with chloroform, washed with water and sodium bicarbonate solution, dried and evaporated under reduced pressure. The crude residue obtained (505 mg.) shows no strong absorption in the ultra-violet region above 210 m$\mu$ and represents the crude $\Delta^5$-3:20-dioxo-19-hydroxy-pregnene.

This crude product is dissolved in 20 ml. of chloroform and treated for 5 minutes with dry hydrogen chloride gas at room temperature. The solution is then washed neutral, dried and evaporated. There is obtained a yellow residue from which by crystallization from methylene chloride-hexane 320 mg. of $\Delta^4$-3:20-dioxo-19-hydroxy-pregnene of M.P. 173–174° C. is obtained.

In a completely analogous way, but using zinc dust previously activated with dilute sulfuric acid and extending the reaction time in the reduction step to 60 minutes from the $\Delta^4$-3:20-dioxo-6$\beta$:19-oxido-17$\alpha$-acetoxy-pregnene the $\Delta^5$-3:20-dioxo-17$\alpha$-acetoxy-19-hydroxy-pregnene is obtained.

Example 5

A solution of 1.30 grams of 19-hydroxy-progesterone in 30 cc. of pyridine is added to a solution of 2.6 grams of chromium trioxide in 25 cc. of water and 50 cc. of pyridine. The mixture is heated while being stirred for one hour at 60° C., cooled, poured over ice, repeatedly extracted with ether, and the extracts are successively washed with water, dilute hydrochloric acid, water, sodium bicarbonate solution and with water, dried, and the ethereal solution is evaporated in a water-jet vacuum, to yield 1.25 grams of crude 19-oxo-progesterone melting at 139.5–140.5° C. The pure compound, obtained by recrystallization from ether+petroleum ether, melts at 140 to 142° C. Optical rotation $[\alpha]_D^{27} = +249.4$°C. (in choloroform). The infra-red spectrum (in methylene chloride) contains bands, inter alia, at 3.63, 5.86 (with shoulder at 5.80$\mu$), 5.96, 6.16, 7.36, 8.16, 8.28, 8.60 and 11.51$\mu$.

Analogous oxidation of 450 mg. of $\Delta^4$-3:20-dioxo-17$\alpha$-acetoxy-19-hydroxy-pregnene yields 395 mg. of $\Delta^4$-3:19:20-trioxo-17$\alpha$-acetoxy-pregnene.

Example 6

2.216 grams of $\Delta^4$-3:11:20-trioxo-6$\beta$:19-oxidopregnene are dissolved in a mixture of 44 cc. of glacial acetic acid and 2.2 cc. of water, and within 20 minutes at 40° C. 22 grams of zinc dust are stirred in portionwise. On completion of the addition the mixture is stirred on for 10 minutes at 40° C., the unconsumed zinc is filtered off and rinsed with 44 cc. of glacial acetic acid the filtrate contains $\Delta^5$-3:11:20-trioxo-19-hydroxy-pregnene. The filtrate is mixed with 22 cc. of water and 2.2 grams of sodium acetate and stirred for 30 minutes at 100° C., then cooled, concentrated in a water-jet vacuum to about 10 cc. and diluted with water and methlyene chloride. The organic solution is washed with sodium bicarbonate solution and water, dried and evaporated, to yield 2.12 grams of crude, crystalline $\Delta^4$-3:11:20-trioxo-19-hydroxypregnene which, after recrystallization from methanol and acetone+ether, melts at 203–205° C. Optical rotation $[\alpha]_D = +232.60$ (in chloroform). Ultra-violet maximum at 241 m$\mu$ ($\epsilon=13,350$). Infra-red bands inter alia at 2.79, 2.90, 5.85, 5.98, 6.16, 7.20, 7.37, 8.24, 8.46 and 9.30$\mu$.

A solution of 500 mg. of $\Delta^4$-3:11:20-trioxo-19-hydroxypregnene in 20 cc. of acetone is cooled to 10° C., mixed with 1.9 cc. of a 26.6% solution of chromium trioxide in sulfuric acid of 42% strength and the mixture is stirred for 30 minutes at 5–10° C., then diluted with 40 cc. of water and extracted three times with benzene. The benzene extracts are washed successively with water, saturated sodium carbonate solution and with water, dried and evaporated in a water-jet vacuum. Yields: 348 mg. of crude crystaline $\Delta^4$-3:11:19:20-tetraoxopregnene which, after recrystallization from methylene chloride+ ether, settles out in the form of scales which above about 170° C. turn onto spikes and then melt at 205–207° C. Optical rotation $[\alpha]_D = +527$° (in chloroform). Ultra-violet maximum at 247 m$\mu$ ($\epsilon=11,150$). Infra-red bands inter alia at 5.83, 5.95, 6.15, 7.19, 7.37, 8.16, 8.24, 8.65 and 11.60$\mu$.

The sodium carbonate extracts obtained as described above are acidified with 2 N-sulfuric acid and then extracted with methylene chloride. These extracts give a total yield of 173 mg. of crude $\Delta^4$-3:11:20-trioxopregnene-19-acid which is dissolved in 10 cc. of tertiary butanol. The solution is mixed with 1.0 cc. of concentrated hydrochloric acid and then refluxed for 20 minutes, concentrated in a water-jet vacuum to about 3 cc., diluted with methylene chloride, and the solution is washed with water and dilute sodium bicarbonate solution, dried and evaporated. Yield: 121 mg. of neutral product which is chromatographed on 5.0 grams of alumina. The fractions eluted with a 9:1-mixture of benzene and ethyl acetate give on crystallization from methylene chloride+ ether 62 grams of $\Delta^4$-3:11:20-trioxo-19-norpregnene (11-keto-19-nor-progesterone) melting at 167–169° C. Optical rotation $[\alpha]_D = +278$° (in chloroform). Ultra-violet maximum at 240 m$\mu$ ($\epsilon=16,450$). Infra-red bands inter alia at 5.84, 5.97, 6.16, 7.20, 7.38, 8.33, 8.66, 9.42, 10.00 and 11.32$\mu$.

Example 7

650 mg. of the 19:6$\beta$-lactone of 3$\beta$:20$\beta$-diacetoxy-5$\alpha$-chloro-6$\beta$-hydroxy-pregnane-19-oic acid melting at 185–190° is dissolved in 20 ml. acetic acid is desired for 2 hours under reflux with 20 g. of zinc dust. The mixture is filtered, the filtrate concentrated under reduced pressure and then diluted with chloroform. The solution is washed with 2-n-sulfuric acid, then with water, dried and evaporated 520 mg. of crude $\Delta^5$-3$\beta$:20$\beta$-diacetoxy-pregnane-19-oic acid is obtained.

Example 8

11.56 grams of 5$\beta$:20$\beta$-diacetoxy-5$\alpha$-bromo-6$\beta$:19-oxido-pregnane are dissolved in 380 ml. glacial acetic acid and 19 ml. water and stirred at 40 to 50° C., while 50 grams of zinc dust are added within 40 minutes. The mixture is then filtered, the filtrate concentrated under reduced pressure, diluted with water and extracted with methylene chloride. After the usual working up and crystallization of the crude product from methylene-chloride-ether there are obtained 8.0 grams of pure $\Delta^5$-3$\beta$:20$\beta$-diacetoxy-19-hydroxy-pregnane F 129–130° C.

What is claimed is:

1. 19-oxygenated $\Delta^5$-pregnenes of the formula

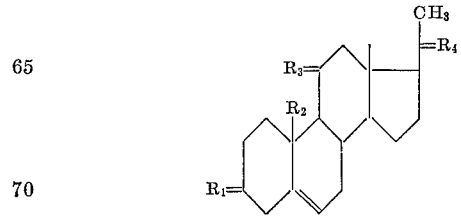

wherein $R_1$ stands for a member selected from the group consisting of oxo, hydrogen together with hydroxy and hydrogen together with lower alkanoyloxy, $R_2$ stands for a member selected from the group consisting of formyl, ethylenedioxy-methyl and carboxyl, and $R_3$ and $R_4$ each stands for a member selected from the group consisting of oxo, hydrogen together with hydroxy and hydrogen together with lower alkanoyloxy.

2. $\Delta^5$-3:19:20-trioxo-pregnene.
3. $\Delta^5$-3$\beta$:11$\alpha$:20$\beta$-triacetoxy-19-oxo-pregnene.
4. $\Delta^5$-3$\beta$:11$\alpha$:20$\beta$-trihydroxy-19-ethylenedioxy - pregnene.
5. $\Delta^5$-3:11:20-trioxo-19-ethylenedioxy-pregnene.
6. $\Delta^5$-3$\beta$:11$\alpha$:20$\beta$-triacetoxy-pregnene-19-oic acid.
7. $\Delta^5$-3$\beta$:20$\beta$-diacetoxy-pregnene-19-oic acid.
8. 19-oxygenated $\Delta^5$-pregnenes of the formula

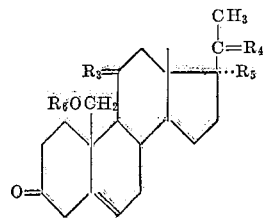

wherein $R_3$ and $R_4$ each stands for a member selected from the group consisting of oxo, hydrogen together with hydroxy and hydrogen together with lower alkanoyloxy, $R_5$ stands for a member selected from the group consisting of hydrogen, hydroxy and lower alkanoyloxy and $R_6$ stands for hydrogen.

9. $\Delta^5$-3:20-dioxo-19-hydroxy-pregnene.
10. $\Delta^5$-3:20-dioxo-17$\alpha$-acetoxy-19-hydroxy-pregnene.
11. $\Delta^5$-3:11:20-trioxo-19-hydroxy-pregnene.
12. $\Delta^5$-3$\beta$:20$\beta$-diacetoxy-19-hydroxy-pregnene.

References Cited by the Examiner
UNITED STATES PATENTS
3,154,569  10/1964  Ercoli et al. _____ 260—397.1

LEWIS GOTTS, *Primary Examiner*.